Dec. 25, 1928.  
J. E. TREWHITT ET AL  
1,696,369  
WATER SOFTENING APPARATUS  
Filed Nov. 8, 1926
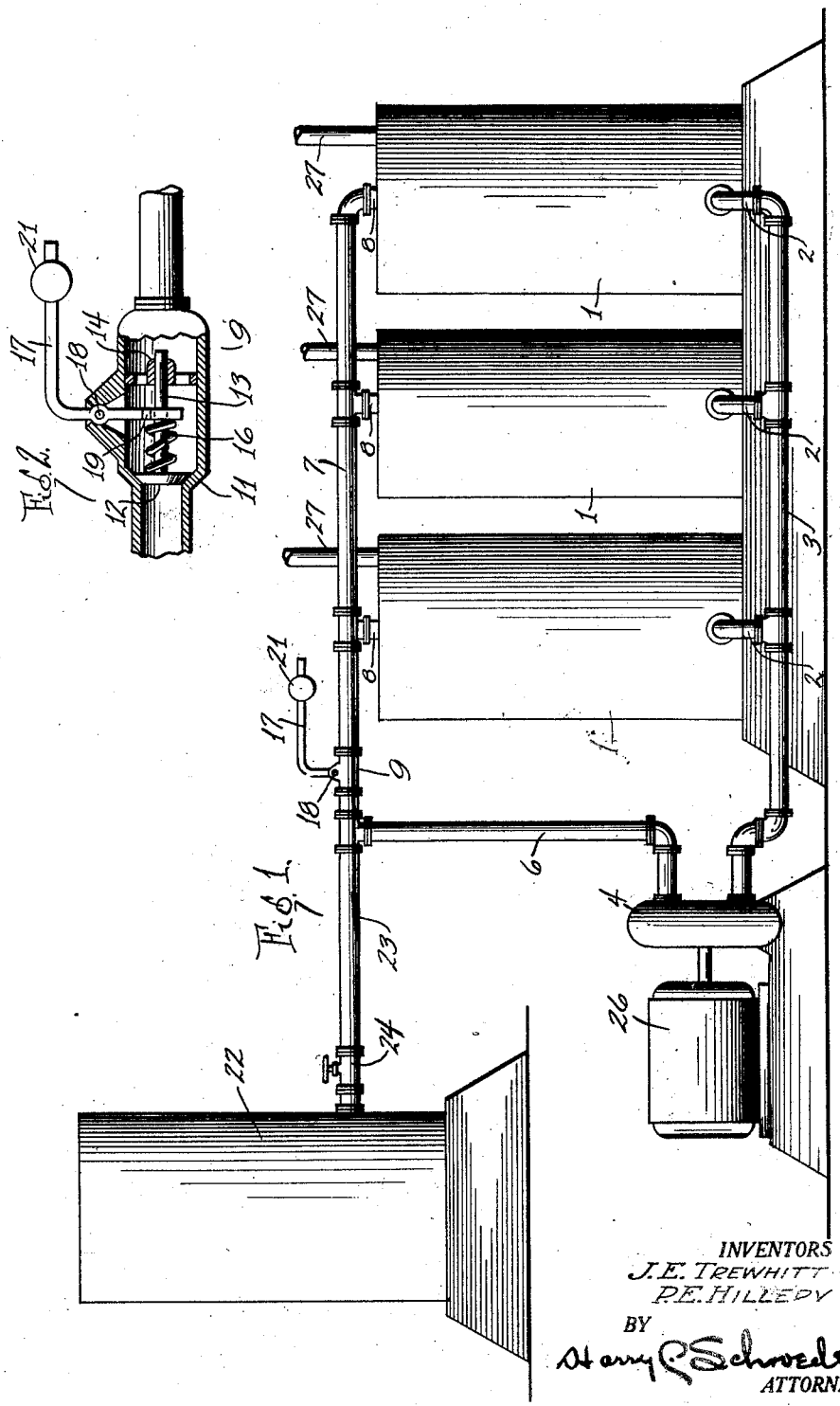
INVENTORS  
J.E. TREWHITT  
P.E. HILLERY  
BY Harry P Schroeder  
ATTORNEY Patented Dec. 25, 1928.

1,696,369

UNITED STATES PATENT OFFICE.

JAMES E. TREWHITT AND PURLEY E. HILLERY, OF OAKLAND, CALIFORNIA, ASSIGNORS TO OAKLAND CALIFORNIA TOWEL COMPANY, OF OAKLAND, CALIFORNIA, A CORPORATION OF CALIFORNIA.

WATER-SOFTENING APPARATUS.

Application filed November 8, 1926. Serial No. 146,875.

The present invention relates to improvements in water softening apparatus, and its particular object is to provide apparatus in which water may be continuously circulated and pass thru a softening agent while at the same time water may be withdrawn under pressure from the circulating system for use at any desired point. In the system as used at the present time, it is usually necessary to stop the circulation of the water for the purpose of softening the same before water may be withdrawn from the system. It is the particular object of the present invention to provide an arrangement allowing water to be withdrawn any time without interfering with the softening process.

Further objects and advantages of our invention will appear as the specification proceeds.

The preferred form of our invention is illustrated in the accompanying drawing in which Figure 1 shows our apparatus, somewhat diagrammatically, in side elevation, and Figure 2 shows a sectional detail view of a valve used in our apparatus.

While we have shown only the preferred form of the invention, we wish to have it understood that various changes or modifications may be made within the scope of the claims hereto attached without departing from the spirit of the invention.

In its preferred form, our apparatus comprises a battery of tanks 1 connecting at their bottom ends thru pipes 2 with a conduit 3 leading to a pump 4 which latter discharges into a conduit 6 leading to a horizontal conduit 7 provided with short pipes 8 discharging into the tanks 1. The latter tanks are filled with a chemical used for softening water passing thru the same. The conduit 7 is provided near its juncture with the conduit 6 with a valve 9 comprising a valve seat 11, a valve element 12, a stem 13 slidable in a guide 14, a spring 16 tending to seat the valve element, and a lever 17 pivoted as shown at 18 and bearing with one forked end 19 upon the end of the spring 16 while carrying a slidable weight 21 on the free arm thereof. Moving the weight 21 back and forth increases and decreases the tension of the spring 16 respectively.

The conduit 7 extends beyond its junction with the conduit 6 and leads to a tank 22 which may represent the point at which the softened water is to be used. The extension 23 of the conduit 7 is provided with an ordinary valve 24 which may be opened and closed at will.

The pump may be driven by means of a motor 26. Water may be admitted into the tanks 1 in any suitable manner as by the pipe 27.

The operation of our system will be readily understood from the foregoing description. When the pump is in operation, water is circulated continuously thru the tanks 1, the conduit 3, the pump 4, and the conduits 6 and 7. The valve 12 constitutes an impediment in the circulation of the water and causes a pressure to be built up in front of the tanks, the degree of pressure being dependent upon the tension of the spring 16 which, as has been said before, may be adjusted by manipulating the weight 21. When it is desired to withdraw water from the circulating system, the valve 24 is opened and now softened water is discharged thru the conduit 23 into the tank 22 due to the impediment offered by the valve 12. This withdrawal may take place without interference with the continuation of the circulating system. New water may be admitted thru the pipe 27 to compensate for the water withdrawn, and, if desired, a suitable float system may be used for maintaining the water at a desired level.

We claim:

1. A water softening apparatus of the character described comprising a tank adapted to have a chemical therein, means for circulating water through said tank, means adjustable from the outside of said apparatus for building up localized pressure in said means and means allowing water to be withdrawn from the region of localized pressure.

2. A water softening apparatus of the character described comprising a tank adapted to have a chemical therein, a conduit and a pump therein adapted to circulate water through the tank, means adjustable from the outside of said apparatus for building up localized pressure in the conduit and means allowing water to be withdrawn from the region of localized pressure.

3. A water softening apparatus of the character described comprising a tank adapted to have a chemical therein, a conduit and a pump therein adapted to circulate water through the tank, a resiliently seated check valve in the conduit impeding the circulation of the water so as to build up pressure in front of the same and means allowing water to be withdrawn from the region of built-up pressure.

4. A water softening apparatus as defined in claim 3, in which means are provided allowing the impedance offered by the check valve to be adjusted.

5. A water softening apparatus of the character described, comprising a tank adapted to hold a chemical therein, a conduit and a pump therein adapted to circulate water through the tank and flow impeding means in said conduit comprising a valve seat, a valve adapted to seat thereon, a spring bearing on the valve and tending to seat the same and a lever pivoted to bear on the spring with one arm thereof and having a weight slidable on the other arm so as to allow the tension of the spring to be adjusted by moving the weight.

In testimony whereof we affix our signatures.

JAMES E. TREWHITT.
PURLEY E. HILLERY.